UNITED STATES PATENT OFFICE 2,392,852

SYNTHETIC OESTROGENS

Morris S. Kharasch, Chicago, Ill., assignor to Eli Lilly and Company, Indianapolis, Ind., a corporation of Indiana No Drawing. Application November 13, 1943, Serial No. 510,218

6 Claims. (Cl. 260—613)

This application is a continuation in part application of the copending application Serial No. 425,127, filed December 31, 1941.

This invention relates to synthetic female sex hormones, and more particularly, to the oestrogens stilboestrol (p,p'-dihydroxy-3,4-diphenyl-3-hexene) and hexoestrol (p,p'-dihydroxy-3,4-diphenylhexane), and, further, to processes for the preparation of these synthetic oestrogens. This invention also relates to new intermediates for oestrogens and their preparation from anethole and related compounds.

Both stilboestrol and hexoestrol have been previously prepared by a number of methods. However, the methods of the prior art have, in common, outstanding disadvantages; e. g., low yield of product and relatively rare raw materials.

This invention has, as an object, the preparation of oestrogens in improved yield. Another object is to prepare oestrogens from readily available raw materials. Still another object is new intermediates for the preparation of oestrogens, and a method of producing the same. Other objects will become more apparent hereinafter.

It has now been discovered that new intermediates for stilboestrol and hexoestrol can be made from anethole and similar compounds, and that these oestrogens can be easily prepared from such intermediates. By way of illustration, the process will be discussed with regard to anethole as the starting material, the scope of the invention being more fully set forth hereinafter. The chemistry of the process is as follows: Anethole is halogenated with dry hydrogen bromide to anethole hydrobromide, thus:

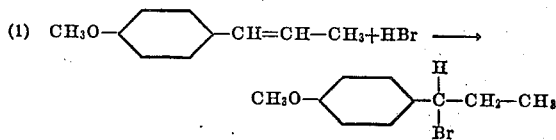

Anethole hydrobromide is reacted with excess sodamide in liquid ammonia to produce a product having the empirical formula $C_{20}H_{24}O_2$, thus:

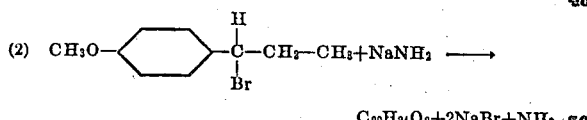

$$C_{20}H_{24}O_2 + 2NaBr + NH_3$$

The product having the empirical formula $C_{20}H_{24}O_2$ noted in Equation 2 is a new compound. It has two p-methoxyphenyl groups and a melting point of 120.5° C. (corrected). The new product is not p,p'-dimethoxy-3,4-diphenyl-3-hexene, but yields stilboestrol upon subsequent treatment to be hereinafter described. Moreover, it is not the isomer described by Wessely and Kleedorfer [Naturwiss., 27, 567 (1939)]; for one form of the isomer so described is an oil, while the other is a solid melting at 50° C. Accordingly the composition obtained by the reaction outlined in Equation 2 may be represented by either of the following formulas:

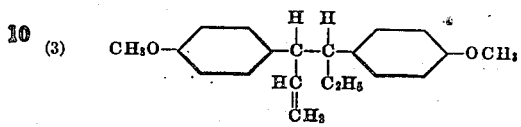

two racemic pairs
p,p'-dimethoxy-3,4-diphenyl-1-hexene or

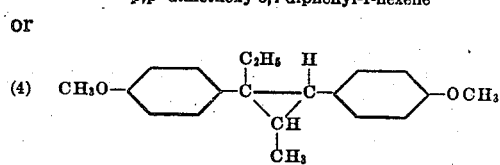

1-methyl - 2,3-di-(p-methoxyphenyl) -3-ethylcyclopropane

When this new product having the melting point of 120.5° C. is demethylated, the double bond shifts and stilboestrol is formed, thus:

(5) $C_{20}H_{24}O_2$ $\xrightarrow{KOH}$

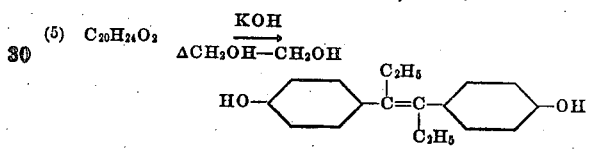

Moreover, when the new product having the melting point of 120.5° C. is hydrogenated, the dimethyl ether of hexoestrol is formed, thus:

(6) $C_{20}H_{24}O_2 + H_2 \longrightarrow$

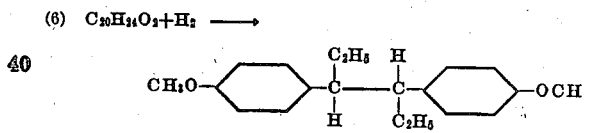

This ether can be demethylated to yield hexoestrol, which also has potent oestrogenic properties, thus:

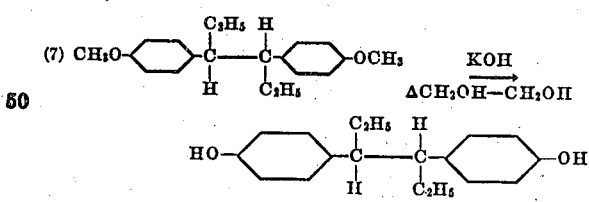

The process will now be described in detail, it being understood that this description is merely by way of illustration and that suitable changes may be made as will become more apparent hereinafter.

*Example 1*

Three tenths mole of anethole diluted with 2½ times its volume of a dry hydrocarbon solvent, preferably toluene, is caused to absorb .3 mole of dry hydrogen bromide. This operation is conducted at —15° to —20° C. Lower temperatures (—80° C.) may be used but they offer no great advantages over the temperatures of —15° to —20° C. At the completion of the reaction, the mixture is allowed to rise to 0° C. and a stream of an inert gas ($CO_2$ or $N_2$) is bubbled through it to displace any excess of hydrogen bromide. The mixture is then degassed by evacuation with a water pump. The solution is then cooled again and maintained at —80° C. until used.

This solution of anethole hydrobromide is added in small portions to a vigorously agitated solution-suspension of 40 parts (three moles) of sodamide in about 700 parts of liquid ammonia. The following color changes ensue: the mixture is a yellow-green after the first addition and becomes a deep red in a few minutes; each subsequent addition discharges the color and the same sequence again ensues. After all the organic reactant has been added and the reaction has gone to completion, as evidenced by the return of the deep red color, the ammonia is evaporated and the residue is taken up in water, acidified, and extracted with ethyl acetate until the extracts are colorless. The ethyl acetate solution is dried and filtered, and the ethyl acetate is removed by distillation at reduced pressure. The residual oil is dissolved in methanol, whereupon a separation of crystalline material is obtained. This crystalline material is the product which has the empirical formula $C_{20}H_{24}O_2$ and which has two p-methoxyphenyl groups as heretofore described. The total yield of this product is 17 parts or 34 percent of the theoretical. Fourteen (14) parts of purified product melting at 118° C. is recovered after recrystallization from methanol. A small sample purified by many recrystallizations melts at 120.5° C. (corrected), whose properties and absorption spectra indicate the structure of p,p'-dimethoxy-3,4-diphenyl-hexene-1 or 1-methyl-2,3-di-(p-methoxyphenyl)-3-ethylcyclopropane. The residue from the reaction was mainly composed of polymerized anethole and high boiling oils.

*Example 2*

A measured quantity of the product having the empirical formula $C_{20}H_{24}O_2$, obtained as described in Example 1 and dissolved in methanol, is hydrogenated at room temperature and at a hydrogen pressure slightly in excess of one atmosphere (4 to 8 cm.), with platinum black as a catalyst. The calculated amount of hydrogen to saturate one double bond is absorbed, and hexoestrol dimethyl ether of M. P. 142° C. is isolated in nearly quantitative yield. This substance did not depress the melting point on authentic sample of hexoestrol dimethyl ether prepared by a well established method.

*Example 3*

Two (2) parts of hexoestrol dimethyl ether, 3 parts of KOH, and 30 parts of ethylene glycol are sealed in a heavy Pyrex bomb tube and heated at 242° C. for 12 to 18 hours. The resulting mixture is diluted, the water filtered to remove silica, and acidified. The milky solution thus formed is digested for a short time in a steam bath and cooled, and the precipitate which has separated is cooled on a filter. By crystallization from benzene, the crude product is separated into an oil and a solid. The solid material melts at 180° C. and is identified as hexoestrol by the fact that it did not lower the melting point of the authentic sample of that material prepared by well established methods. The yield of this material is nearly quantitative.

*Example 4*

Two (2) parts of the product having the empirical formula $C_{20}H_{24}O_2$ obtained as described in Example 1, 5 parts of KOH, and 30 parts of ethylene glycol are sealed in a heavy Pyrex bomb tube and heated at 224° C. for 18 hours. The resultant mixture is diluted with water, filtered to remove silica and acidified. The milky solution thus formed is digested for a short time on a steam bath, cooled, and the solid which separates is collected on a filter. By recrystallization from benzene, the crude product is separated into an oil and a solid. The latter is identified as stilboestrol after several recrystallizations—yield 0.9 part. The residual oil, when treated at 224° C. with 1.5 parts of KOH in 8 parts of ethylene glycol in a sealed tube as above, gives an additional 0.1 part of solid.

While the invention has been specifically described with reference to anethole, it is not limited thereto. Since the methyl radical of the alkoxy group in this compound is inactive during hydrohalogenation and during reaction with sodamide, it may be replaced by other alkyl radicals without materially affecting such reactions. Moreover, both stilboestrol and hexoestrol can be prepared from the product having the empirical formula $(R)_2C_{18}H_{18}$ in which R is an alkoxy group and which may be represented by either of the following structural formulas:

(7) 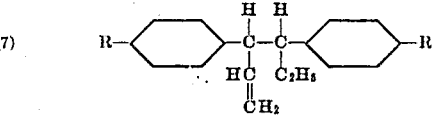

two racemic pairs p, p'-dialkoxy-3, 4-diphenyl-1-hexene or (8) 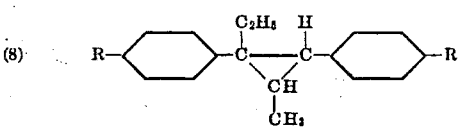

1-methyl-2, 3-di (p-alkoxyphenyl)—3-ethylcyclopropane in which R is an alkoxy group. In either case, the alkoxy groups are converted to hydroxy groups to produce the oestrogen. Moreover, other oestrogens can be prepared by the use of compounds having more than one alkoxy group. Furthermore, the —CH=CH—CH₃ group of the raw material can be replaced by other hydrocarbon groups containing the double bond in the same position. In general, suitable raw materials are compounds of the formula (9) 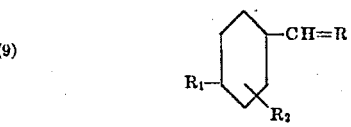

wherein R is an alkylidene radical of from 2 to 6 carbon atoms, $R_1$ is an alkoxy radical of from 1 to 4 carbon atoms, $R_2$ is a member of the group consisting of hydrogen and alkoxy radicals of from 1 to 4 carbon atoms, and $R_1$ and $R_2$ can be joined together to form a structure

(10) 

wherein $R_3$ is a member of the group consisting of hydrogen and alkyl radicals of from 1 to 4 carbon atoms.

As specific examples of compounds of this class, there may be mentioned isosafrol, methyl ether of isoeugenol, para-(1-propenyl) phenetol, para-isopropenyl anisole, para-(1-butenyl) anisole, and ethylene ether of 3,4-dihydroxy-(1-propenyl)benzene,

(11) 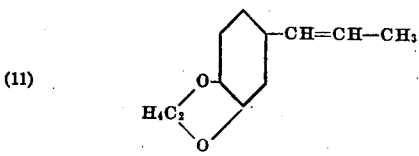

While hydrohalogenation is preferably carried out with hydrogen bromide, as illustrated, both hydrogen chloride and hydrogen iodide can be used under suitable conditions. One must always bear in mind the fact that the unsaturated compounds are polymerized by halogen acids. For that reason, it is desirable to carry out the addition of the halogen acids under such conditions where such polymerization will be at a minimum. Such conditions might involve the addition of the halogen acid in solvents other than hydrocarbon solvents; for instance, dihexane may be conveniently used as a solvent in many cases.

While sodamide is preferred for the condensation step, other ammonia soluble amides may be used, such, for example, as potassium amide or calcium amide. In general, the amides of alkali and alkaline-earth metals are suitable. The amide must be present in excess to obtain a good yield, and, preferably, there should be present at least three mole equivalents of the amide for each mole equivalent of the compound to be condensed. For these two reasons, it is desirable to add the hydrohalide addition product dissolved in a suitable solvent, such as toluene, to the alkali amides dissolved in liquid ammonia rather than that used in the first procedure.

This step may be carried out at any desired temperature below the critical temperature of ammonia, suitable pressure being used to keep the ammonia in the liquid state. However, high temperatures and pressure are less desirable than low temperatures (below $-35°$ C.) and atmospheric pressure due to the fact that high temperatures promote the formation of by-products. The amount of liquid ammonia should be sufficient to form a solution of the amide, but is not critical.

The hydrogenation of the product having the empirical formula $C_{20}H_{24}O_2$ may be varied in wide limits from the exact procedure set forth in Example 2. Thus, instead of methanol as a solvent, ethanol or glacial acetic acid or other polar solvents may be used. Furthermore, instead of platinum black as a catalyst, Raney nickel or paladium black on barium sulfate or asbestos may be employed. Other known mild hydrogenation catalysts gave equally satisfactory results. The temperature and pressure during hydrogenation may be varied considerably without hydrogenating the double bonds of the benzene ring.

However, high pressures and high temperatures should be avoided.

In Examples 3 and 4, a specific procedure has been disclosed for demethylating the alkoxy compounds to hexoestrol and stilboestrol. However, these conditions may also be varied over a wide range within the limits. Thus, instead of ethylene glycol other high boiling polar liquids may be employed; for instance, glycerin or trimethylene glycol. The temperature of the reaction may also be varied. Thus, it is possible to demethylate using a temperature of $200°$ C., although a longer period of time is then necessary. However, it is not desirable to carry out the demethylation temperatures higher than $250°$ C. for considerable decomposition takes place at those temperatures. Instead of potassium hydroxide as the alkali, sodium hydroxide may be used, although the former reagent is preferable.

It is apparent that many widely different embodiments of this invention may be made without departing from the spirit and scope thereof, and, therefore, it is not intended to be limited except as indicated in the appended claims.

What is claimed is:

1. Process of making a synthetic oestrogen which comprises reacting a compound of the formula

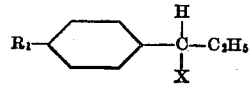

wherein $R_1$ is an alkoxy radical of from 1 to 4 carbon atoms and X is halogen, with an excess of an amide of the group consisting of alkali metal and alkaline-earth metal amides, in liquid ammonia, hydrogenating the resulting product and dealkylating the thereby formed p,p'-dialkoxy-3,4-diphenylhexane to make p,p'-dihydroxy-3,4-diphenylhexane.

2. Process of making a synthetic oestrogen which comprises reacting anethole hydrobromide with sodamide in liquid ammonia, hydrogenating the resulting product and demethylating the thereby formed p,p'-dimethoxy-3,4-diphenylhexane to make p,p'-dihydroxy-3,4-diphenylhexane.

3. In the process of making a synthetic oestrogen, the step which comprises hydrogenating the compound having the empirical formula $C_{20}H_{24}O_2$, two p-methoxyphenyl groups and a melting point of $120.5°$ C. to p,p'-dimethoxy-3,4-diphenylhexane.

4. In the process of making a synthetic oestrogen, the step which comprises reacting with hydrogen in the presence of a hydrogenation catalyst, the compound having the empirical formula $C_{20}H_{24}O_2$, two p-methoxyphenyl groups and a melting point of $120.5°$ C.

5. In the process of making a synthetic oestrogen, the step which comprises reacting, with hydrogen in the presence of platinum black at room temperature, the compound having the empirical formula $C_{20}H_{24}O_2$, two p-methoxyphenyl groups and a melting point of $12.5°$ C.

6. In the process of making a synthetic oestrogen, the steps which comprise reacting, with hydrogen in the presence of a hydrogenation catalyst, the compound having the empirical formula $C_{20}H_{24}O_2$, two p-methoxyphenyl groups and a melting point of $120.5°$ C.; and demethylating the resulting p,p'-dimethoxy-3,4-diphenylhexane.

MORRIS S. KHARASCH.

Certificate of Correction

Patent No. 2,392,852.                              January 15, 1946.

MORRIS S. KHARASCH

It is hereby certified that errors appear in the printed specification of the above numbered patent requiring correction as follows: Page 1, second column, line 40, for that portion of the formula reading "OCH" read $OCH_3$; page 3, second column, line 64, for "12.5° C." read *120.5° C.*; and that the said Letters Patent should be read with these corrections therein that the same may conform to the record of the case in the Patent Office.

Signed and sealed this 30th day of April, A. D. 1946.

[SEAL]

LESLIE FRAZER,
*First Assistant Commissioner of Patents.*